Aug. 23, 1955  P. J. CLARKE  2,715,843
MEANS FOR ROTATING TURNBUCKLES AND THE LIKE
Filed June 8, 1954
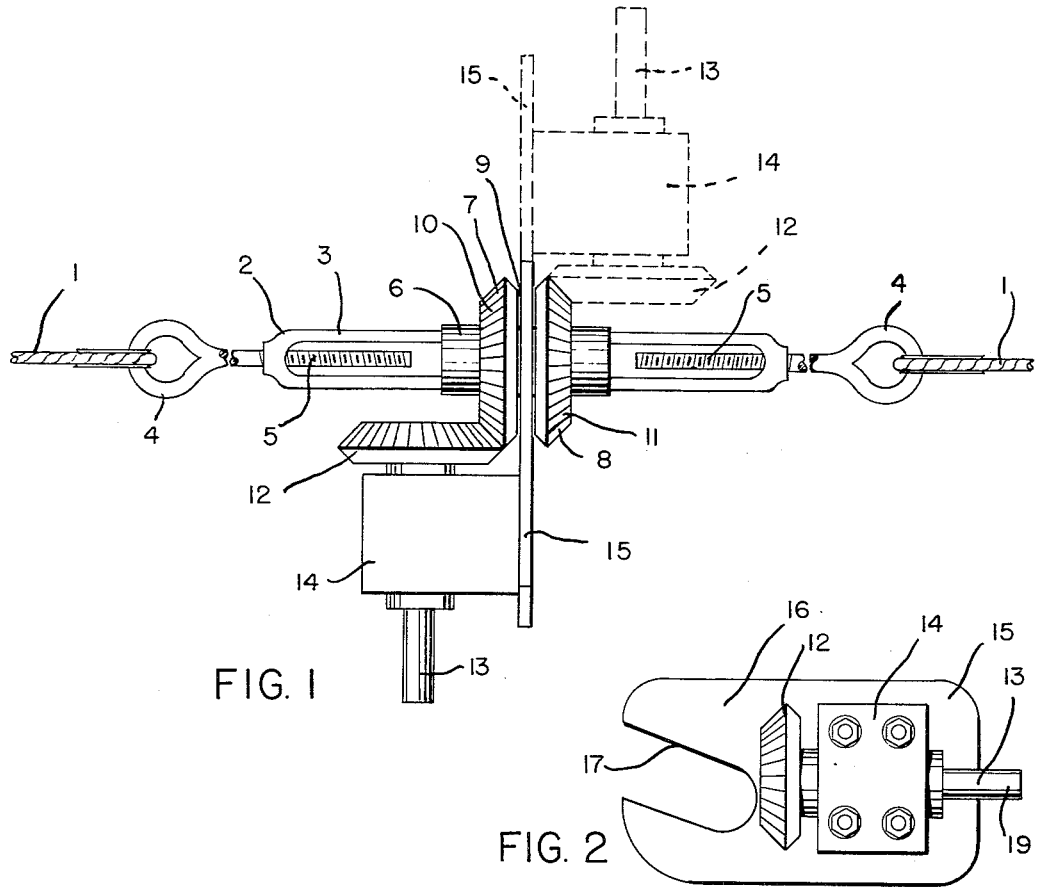
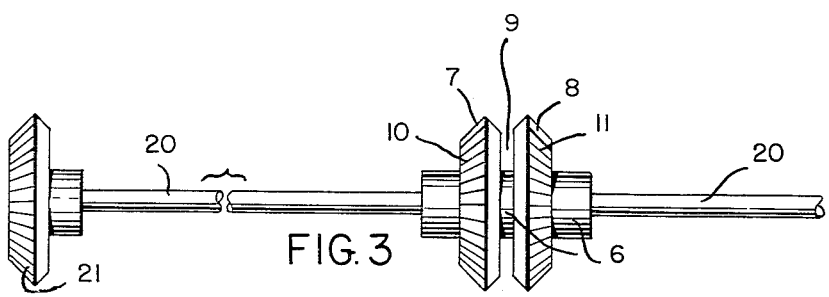
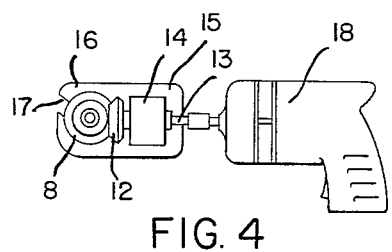
INVENTOR.
PATRICK J. CLARKE
BY
Richard P. Carden
AGENT

United States Patent Office 2,715,843
Patented Aug. 23, 1955

2,715,843

MEANS FOR ROTATING TURNBUCKLES AND THE LIKE

Patrick J. Clarke, Duluth, Minn.

Application June 8, 1954, Serial No. 435,291

3 Claims. (Cl. 74—417)

This invention relates to means for rotating turnbuckles and the like which require rotation in two directions for normal operation.

Turnbuckles are used extensively on boats, docks, and the like, to tighten cables and guys. These turnbuckles require the use of a wrench or bar for rotation and require a great deal of time, relatively speaking, to rotate to proper adjusted position.

It is one of the principal objects of my invention to provide an improved turnbuckle and rotating means therefor which can be operated more quickly and efficiently than conventional turnbuckles.

Another object is to provide a turnbuckle or the like which is provided with a pair of oppositely disposed bevel gears, the gears being spaced apart to receive the guide or mounting member of the drive mechanism for rotating the turnbuckle or the like in either direction, one of said gears being employed for driving the gear in each of its rotatable directions, and the guide or mounting member being insertable from opposite sides of the gears for engaging one of the other of the gears.

Another object of my invention is to provide a removable drive mechanism which may be employed for rotating any turnbuckle equipped with gears in accordance with my invention thereby providing for reduced overall cost of an installation and providing convenience in operation of the devices.

Another object of my invention is to provide a drive mechanism for rotating turnbuckles equipped with my invention which may be powered manually or by suitable motor means as desired.

Another object is to provide means for rotating turnbuckles and the like on their longitudinal axes in either direction by means of a quickly attachable and detachable drive mechanism.

These and other objects and advantages of my invention will become more apparent as the description proceeds.

In the accompanying drawing forming a part of this application:

Fig. 1 is an elevational view showing the turnbuckle with my invention in operating position relative thereto.

Fig. 2 is an elevational view of the drive mechanism.

Fig. 3 is an elevational view of a modified form of my invention.

Fig. 4 is an end view of the turnbuckle being rotated by means of my invention.

In the drawing the reference numerals 1—1 indicate the opposed ends of a cable intermediate which a turnbuckle 2 is connected for tightening or loosening the cable in a conventional manner. The turnbuckle comprises a central or body member 3 which normally is rotated to draw the eyes 4—4 towards each other or to permit them to move away from each other by means of the threaded stems 5—5 which are threadedly carried in opposite ends of body member 3. The turnbuckle and cable are old in the art.

My invention relates to means for rotating the body member 3 on its longitudinal axis in either of its rotatable directions. In the case of a turnbuckle the rotation of the body member 3 in two directions will cause the eyes 4 to move away from the body member 3 (provided the eyes are held stationary, of course) and the rotation of the body in the opposite direction will cause the eyes to move toward the body 3.

In my invention I provide a sleeve member 6, and I mount a pair of bevel gears 7—8 thereon, the gears being rigidly fixed to the sleeve 6 and being spaced apart as shown to provide a slot or angular opening 9 between the bevel gears. The gears 7 and 8 preferably have their toothed surfaces 10 and 11 respectively facing away from each other, as shown. The sleeve 6 serves to mount the gears 7 and 8 on the turnbuckle 3 or the like, the sleeve being fixed relative to the body member 3, of course, whereby the rotation of the gears will cause the rotation of the body.

In order to rotate the gears 7 and 8, I have provided a drive gear 12 mounted on a shaft 13 carried in a suitable housing 14 which contains bearings, not shown, and which may contain reduction gears, not shown, if desired.

The housing 14 is secured to the guide or mounting plate 15, the mounting plate or guide being carried in spaced relation to the gear 12 and in a plane substantially parallel to the axis of rotation of the gear 12 and shaft 13, as shown. The plate 15 has a portion 16 thereof which extends beyond the gear 12 a suitable distance, the purpose of which will become apparent. The portion 16 of the plate 15 has a cut-out or notch 17 therein which extends from the outermost end of the portion 16 toward the gear 12. The notch 17 is of substantially the same width as the diameter of the sleeve 6 so that the sleeve 6 may fit into the notch or cut-out 17 whereby the gear 12 may be engaged on the gear 7 or 8 as desired, see Fig. 1. The portion 16 of the plate 15 is insertable between the gears 7 and 8 in the slot or space 9 between the gears and serves as a guide to hold the gear 12 in driving position relative to the gear 7 or 8 which it is to engage. The slot or notch 17 is angularly disposed relative to the axis of rotation of the gear 12 and shaft 13 as is clearly seen in Fig. 2. The angular disposition of the notch 17 serves to maintain the gear 12 in driving engagement with the gears 7 or 8 which it is intended to drive according to the position in which the portion 16 is inserted in the slot 9.

The gear 12 is intended to be rotated in one direction only so that an electric drill or similar mechanism 18 may be engaged on the extending end 19 of the shaft 13 to rotate the gear 12 continuously in one direction. The notch 17 is disposed in angular position so that it will constantly bias or hold the gear 12 in driving engagement with the gear 7 or 8 it is intended to operate because the gear 12 is driven in one direction only. The notch 17, because of its angular disposition and direction of rotation of the gear 12, prevents the gears from climbing out of mesh, and eliminates the need for the operator to apply any pressure to hold the gears in mesh to operate or rotate the gears, and thereby cause the turnbuckle body 3 or similar shaft-like member to be rotated.

A motor member such as the device 18, shown in Fig. 4, may be employed to rotate the gear 12, or an ordinary hand brace could be secured to the shaft 13 for rotating the gear 12 to provide the drives necessary for operation of my device.

In Fig. 3 I have shown a modified form of my invention wherein the sleeve 6 is mounted on a drive shaft 20 so that the drive mechanism 12 to 17 may be employed to rotate the shaft 20 in either direction on its longitudinal axis. The shaft 20 may have a bevel gear 21 at one end thereof for driving any suitable mechanism in a remote location, such as window opening and closing means, awning raising and lowering means and the like.

Having thus described my invention, what I claim is:

1. Means for rotating the central member of turnbuckles and the like on its longitudinal axes comprising: a sleeve mounted on said member to rotate therewith, a pair of bevel gears fixedly mounted on said sleeve, said gears being oppositely disposed and having a space therebetween, and drive mechanism for rotating said gears comprising a mounting plate having a notch therein to be received between said gears, a bevel drive gear, means mounting said drive gear on said plate adjacent said slot and in normal relation to said plate, and means for rotating said drive gear, said slot in said plate having an angular disposition relative to the axis of rotation of said drive gear to hold the latter in driving engagement with either one of first said gears.

2. Means for rotating an elongated member on its longitudinal axis, comprising: a pair of bevel gears mounted on said member to rotate therewith, said gears being oppositely disposed and having a space therebetween, and drive mechanism for rotating either of said gears comprising a mounting plate having a notch therein to be received between said gears, a bevel drive gear, means mounting said drive gear on said plate adjacent said slot, and means for rotating said drive gear, said slot in said plate having an angular disposition relative to the axis of rotation of said drive gear to hold the latter in driving engagement with first said gears.

3. Means for rotating turnbuckles and the like on their longitudinal axes, said turnbuckle having a rotatable body member, comprising: a sleeve mounted on said body member to rotate therewith, a pair of bevel gears mounted on said sleeve to rotate the latter, said gears being oppositely disposed and having a space therebetween, and drive mechanism for rotating either of said gears comprising a mounting plate having a notch therein to receive said sleeve, said plate being insertable between said gears, a bevel drive gear, means mounting said drive gear on said plate adjacent said slot, and means for rotating said drive gear, said slot in said plate having an angular disposition relative to the axis of rotation of said drive gear to hold the latter in driving engagement with first said gears.

No references cited.